United States Patent [19]

Fisher et al.

[11] Patent Number: 6,162,843

[45] Date of Patent: Dec. 19, 2000

[54] CROSSLINKING OF POLYPROPYLENE POLYMERS BY IRRADIATION

[76] Inventors: Harold M. Fisher, 10115 Balmoral Cir., Charlotte, N.C. 28210; Richard Albert Jones, 16 Beckhill Grove, Leeds, West Yorkshire, United Kingdom, LS7 2RX; Ian Macmillan Ward, Kirskill 2 Creskeld Drive, Branhope, Leeds, West Yorkshire, United Kingdom, LS16 9EL

[21] Appl. No.: 09/043,276

[22] PCT Filed: Sep. 18, 1996

[86] PCT No.: PCT/US96/14967

§ 371 Date: Sep. 11, 1998

§ 102(e) Date: Sep. 11, 1998

[87] PCT Pub. No.: WO97/11097

PCT Pub. Date: Mar. 27, 1997

Related U.S. Application Data

[63] Continuation-in-part of application No. 08/543,756, Sep. 19, 1995, abandoned.

[51] Int. Cl.[7] .................................. C08J 3/24; C08J 3/28; C08F 2/46; C08F 110/06; C08F 255/02

[52] U.S. Cl. ............................................ 522/125; 522/114

[58] Field of Search ....................... 522/125, 114

[56] References Cited

U.S. PATENT DOCUMENTS

| 3,414,498 | 12/1968 | Shinohara et al. |
|---|---|---|
| 3,835,004 | 9/1974 | Kagiya et al. ..................... 204/159.17 |
| 4,134,812 | 1/1979 | Sasaki et al. ............................. 264/25 |
| 5,160,464 | 11/1992 | Ward et al. ............................... 264/22 |

FOREIGN PATENT DOCUMENTS 4034823  5/1992  Germany.

OTHER PUBLICATIONS

*European Polymer Journal*, 1979, vol. 15, pp. 379 to 387 (W.K. Busfield and J.H. O'Donnell).
*British Polymer Journal*, 1986, vol. 18, No. 5, pp. 340 to 344 (W.K. Busfield and R.W. Appleby).
*Polymer Communications*, 1986, vol. 27, pp. 45 to 46 (R.W. Appleby and W.K. Busfield).
*Chemical Abstract* 58944v, vol. 82, p. 66.

*Primary Examiner*—Susan W. Berman

[57] ABSTRACT

Polypropylene is crosslinked by means of an ionizing radiation followed by annealing at a temperature of at least 110° C., in the presence of an unsaturated monomeric compound such as acetylene or 1,3-butadiene or 1,3,5-hexatriene.

35 Claims, 10 Drawing Sheets

CROSSLINKING OF POLYPROPYLENE POLYMERS BY IRRADIATION

This is a continuation-in-part of application Ser. No. 08/543,756 filed on Sep. 19, 1995, now abandoned.

BACKGROUND OF THE INVENTION

This invention relates to a process for crosslinking polypropylene polymers. The process employs steps of irradiation and annealing. The invention further relates to crosslinked polypropylene polymers produced by the process.

There have been earlier proposals to crosslink polypropylene polymers, by processes which employ ionizing radiation. However, there is an inherent difficulty as, in parallel with crosslinking, the backbone polymer chains are prone to degradation by ionizing radiation, this degradation being known as chain scission. The overall effect can be a substantial degradation in mechanical properties.

In Japanese Patent Application No. 74 23582 of Japan Atomic Energy Research Institute, referred to in Chemical Abstract 58944V, vol. 82, 1975, page 66, there is disclosed the crosslinking of polyolefins, using ionizing radiation in the presence of both acetylene and a chloride-containing monomer such as vinyl chloride. The process takes place at room temperature, at at least 1 atm. ($10^5$ Pa) pressure. The radiation level is $10^8$–$10^9$ Rad., a very high level of radiation.

In U.S. Pat. No. 3,835,004 of Japan Atomic Energy Research Institute there is disclosed the crosslinking of polyolefins including polypropylene, using γ-radiation in the presence of acetylene or 1,3-butadiene, and of a fluorine-containing monomer, for example tetrafluoroethylene. Use of the two crosslinking agents is said to produce polyolefins with better properties than those crosslinked with acetylene or 1,3-butadiene alone. In Example 4 of U.S. Pat. No. 3,835,004 the process as applied to high density polypropylene pellets, using both acetylene and tetrafluoroethylene, and 4.8 Mrads of γ-radiation, gave a product with a gel fraction of 0.536. In comparison, use of acetylene alone gave a gel fraction of 0.474.

In U.S. Pat. No. 4,134,812 of Japan Atomic Energy Research Institute and The Furukawa Electric Co., Ltd., there is disclosed a method of manufacturing shaped articles, by blending a polyolefin with crosslinking agents, moulding to the desired shape, and crosslinking the shaped articles by irradiation, using an electron beam. The crosslinking agents, used together, are tetrakis-[methylene-(3,5-di-t-butyl-4-hydroxy-hydrocinnamate)]-methane and a compound X-Y$_m$ where X is a group free from acetylenic linkage, Y is a group containing acetylenic linkage and m is an integer of 1 or more. Preferred compounds X-Y$_m$ are dipropargyl maleate and dipropargyl succinate. Acetylene gas is said not to be possible for use, "because it is not only little miscible with a poly- -olefin due to its own gaseous condition, but also gives rise to the formation of an explosive product by reaction with heavy metals". There is one example of the invention as applied to polypropylene, Example 5. In this example a moulded polymer sheet 3 mm thick, containing 100 parts polypropylene, 5 parts tetramethylene dipropiolate and 0.5 parts of the tetrakis compound, was irradiated in the open air at a dose rate of 20 Mrads. The gel fraction of the irradiated product was 0.75.

Experiments on the irradiation of polypropylene using γ-radiation are described in European Polymer Journal, 1979, vol. 15, pp. 379 to 387 (W. K. Busfield and J. H. O'Donnell). Different isotactic polypropylene film samples were irradiated in vacuo at 35° C. at a range of doses, from 5 Mrads to 150 Mrads. After irradiation the samples were stored for more than 3 weeks before being opened to the atmosphere. There was a significant decrease in the tensile breaking stress and strain, attributed by the authors to fairly extensive chain scission.

Experiments on the crosslinking enhancement in polypropylene film by γ-irradiation in the presence of acetylene are described in British Polymer Journal, 1986, vol. 18, No. 5 (W. K. Busfield and R. W. Appleby). Quenched and pre-annealed samples of polypropylene film were irradiated using γ-radiation, at a dose rate from 5 to 40 Mrads, at 35° C., in the absence of air and the presence of acetylene gas. The samples were annealed for one hour at 100° C. in order to remove any remaining free radicals before opening to the atmosphere. The resultant polypropylene films have improved mechanical properties, in particular improved creep resistance, especially in pre-annealed samples.

Similar experiments are described in Polymer Communications, Feburary 1986, vol. 27, pp. 45–46 (R. K. Appleby and W. K. Busfield). Isotactic drawn polypropylene film was irradiated with γ-radiation at dose rates of 5, 10 and 15 Mrads in ampoules containing acetylene gas. Following irradiation the ampoules were annealed for 1 hour at 100° C. prior to opening. Polypropylene samples having good creep resistance and gel contents of 0.61 (5 Mrads), 0.74 (10 Mrads) and 0.77 (15 Mrads) were obtained.

OBJECT AND SUMMARY OF THE INVENTION

It is an object of the invention to provide a process for obtaining crosslinked polypropylene polymers which are modified or improved, in comparison with earlier crosslinked polypropylene polymers. It is a further object of this invention to provide such modified or improved polypropylene polymers.

In accordance with the present invention there is provided a process for preparing a modified polypropylene polymer from a precursor polypropylene polymer having a melting point of at least 135° C., the process comprising the steps of treating said precursor polymer with an ionizing radiation (hereinafter referred to as "the irradiation step"); and annealing the polymer so treated at an annealing temperature of at least 110° C., in an environment which is substantially free of oxygen gas but which comprises a monomeric compound selected from alkynes, and from alkenes having at least two double bonds (hereinafter referred to as "the annealing step").

A polypropylene polymer as defined herein may be polypropylene homopolymer or a copolymer containing a major proportion of polypropylene.

A polypropylene copolymer comprising a major proportion of polypropylene as defined herein is one comprising more than 50% by weight of polypropylene. Preferably, it has more than 70% by weight of polypropylene, most preferably, more than 85% by weight of polypropylene.

A polypropylene polymer as defined herein may be unsubstituted, or substituted, for example by halogen atoms, preferably fluorine or chlorine atoms. Unsubstituted polypropylene polymers are however preferred.

A polypropylene copolymer comprising a major proportion of propylene may have one or more different copolymers, following copolymerisation with, for example, one or more of ethylene, butadiene, vinyl chloride, styrene or tetrafluoroethylene. Such a polypropylene copolymer may be a random copolymer, or a block or graft copolymer.

A preferred polypropylene copolymer is a propylene-ethylene copolymer, having a major proportion of polypropylene and a minor proportion of polyethylene.

Polypropylene homopolymer is preferred for use in the process of the invention.

The polypropylene polymer may suitably be annealed at a temperature of at least 115° C., preferably at least 120° C. More preferably the polypropylene polymer is annealed at a temperature of at least 130° C., most preferably at a temperature in the range 130 to 140° C. inclusive.

Preferably the polypropylene polymer is annealed at an annealing temperature at least 20° C. below its melting point, most preferably at an annealing temperature which is below its melting point by a temperature differential in the range 20 to 50° C., inclusive, most preferably, 30 to 40° C., inclusive.

The period for which annealing is carried out is not thought to be critical, provided that the time is sufficient for substantially all of the polymer which has been irradiated to reach the said annealing temperature and for substantially all of the radicals formed to have reacted. This can be assessed by trial and error following ESR or mechanical testing of irradiated and annealed samples; the presence of unreacted radicals leads to chain scission and diminution in mechanical properties.

Preferably, the environment for the annealing step is a gaseous environment.

Preferably the irradiation step is effected in an environment which is substantially free of oxygen gas. For example it could be performed in vacuo or in the presence of an inert liquid or gas. Preferably however the environment for the irradiation step also comprises a monomeric compound selected from alkynes, and from alkenes having at least two double bonds. There is no necessity for the said environments to be the same, in the irradiation and annealing steps. Indeed there is no necessity for said monomeric compound used during the irradiation step to be the same as said monomeric compound used in the annealing step; the monomeric compound used in the irradiation step could be replaced in whole or in part by a different monomeric compound for the annealing step. However it is believed that the properties desired of said monomeric compound in the irradiation step will generally be the same as those required in the annealing step, so there will generally be no necessity to effect a whole or partial replacement. Most conveniently, therefore, the monomeric compound is the same throughout. In some cases however it may be advantageous to supply a further charge of said monomeric compound, as the process proceeds.

For either or both steps, a mixture of monomeric compounds could be employed.

The environment employed for the irradiation and/or the annealing steps is preferably constituted entirely by said monomeric compound, but may also comprise a mixture being said monomeric compound together with one or more other components, for example an inert gas or liquid. Suitably the said monomeric compound is gaseous at least under the treatment conditions employed and is employed in the irradiation and/or annealing steps at a pressure, or partial pressure in the case of a mixture, in the range of 0.5–4 atmospheres ($5\times10^4$ Pa–$4\times10^5$ Pa), preferably 0.8–2 atmospheres ($8\times10^4$ Pa–$2\times10^5$ Pa).

Preferred monomeric compounds for use in the present invention, in either or both of the irradiation and annealing steps, are alkynes, and alkenes having at least two double bonds, which alkenes are not substituted by halogen atoms. They are desirably gaseous under the treatment conditions employed and, whether gaseous or liquid, should be able to diffuse into the polypropylene polymer under the treatment conditions employed. Preferred are unsubstituted alkynes or alkenes i.e. alkynes or alkenes made up substantially entirely by hydrogen and carbon atoms. Examples are unsubstituted $C_{2-6}$ alkynes, preferably having only one triple bond, for example acetylene, methyl acetylene, dimethyl acetylene and ethyl acetylene (of which species acetylene is preferred) and unsubstituted $C_{4-8}$ alkenes having at least two double bonds, preferably only two double bonds. Suitable compounds may include 1,3-butadiene, 1,3-pentadiene, 1,3-hexadiene, 1,4-hexadiene and 1,3,5-hexatriene (of which species 1,3-butadiene is preferred).

One preferred class of alkenes for use in the present invention has at least two conjugated double bonds, thus including 1,3-butadiene, 1,3-pentadiene, 1,3-hexadiene and 1,3,5-hexatriene. Preferably the conjugation extends throughout the length of the compound, as is the case with 1,3-butadiene and 1,3,5-hexatriene.

Another preferred class of alkenes for use with the present invention has double bonds at least as the terminal bonds in the compounds, thus including 1,3-butadiene and 1,3,5-hexatriene.

A particularly preferred class of alkenes has at least two conjugated double bonds, preferably with the conjugation extending throughout the length of the compounds, aid double bonds at least as the terminal bonds of the compounds. Compounds of this type thus include 1,3-butadiene and 1,3,5-hexatriene.

Preferably said alkyne or alkene having at least two double bonds is the sole crosslinking agent employed in the irradiation step and/or the annealing step.

Acetylene is an especially preferred monomeric compound for use in the present invention. Preferably acetylene is used as substantially the sole said monomeric compound both in the irradiation step and in the annealing step.

It is believed that the monomeric compound reacts with alkyl radicals formed by the ionizing radiation. Because of the presence of a triple bond or of at least two double bonds, in the monomeric compound, the adduct thereby formed is unsaturated and can react with another such monomeric compound, with the adduct again being unsaturated, and the radical site successively transferring to the end of the extending chain of the adduct. In this way it is believed that side chains can build up, with these being terminated by reaction with other side chains or with alkyl radicals of other polypropylene backbone chains, thereby bringing about crosslinking of the chains. However, the precise mechanism by which the present invention beings about mechanical improvements is not important to the practice of the invention.

Suitably the irradiation step is effected at a temperature not exceeding 100° C., preferably not exceeding 80° C. A preferred range is 0–50° C., most preferably 15–30° C. Conveniently the step is effected at ambient temperature.

In carrying out the process of this invention, any ionizing radiation can be employed. In practice, however, the types of ionizing radiation which can be used with greatest practicality are electron beams, ultra-violet radiation and, γ-rays. Electron beams and γ-rays are preferred, especially γ-rays.

The radiation dose is suitably in the range 0.5 to 100 Mrads inclusive, preferably 1 to 50 Mrads inclusive, most preferably 2 to 20 Mrads inclusive. For many applications a radiation dose of 5 to 15 Mrads inclusive appears very favourable.

The process of the invention may be applied to polypropylene polymers irrespective of their physical form, for example whether they be films, fibres, sheets or moulded articles. In the case of thick sheets and moulded articles the annealing step may need to be relatively long in order to obtain adequate diffusion of said monomeric compound. In commercial practice, therefore, the invention is likely to have greatest application to fibres and, especially, to films. The invention is likely to be especially useful in the treatment of microporous films used as membranes, for example as medical dressings, filter membranes, gas exchange membranes and battery separators. Illustrative patents relating to such microporous films are U.S. Pat. Nos. 3,426,754, 3,558,764, 3,801,404, 3,679,538, 3,843,761, 3,853,601, 4,138,459, 4,539,256, 4,726,989 and 4,994,335. The films described generally have pores connected to each other therein and an average pore size of 1000–2000° A.

The grade of polypropylene polymer treated in the process of the present invention is not thought to be critical. The process is expected to be applicable to all grades of homopolymeric polypropylene, and the polypropylene copolymers as defined above, irrespective of molecular weight, tacticity, degree of crystallinity, and whether they are pre-quenched or pre-annealed. Whilst the use of isotactic polypropylene is preferred, preliminary tests have shown the invention to be applicable to syndiotactic polypropylene, now becoming available.

The process of the invention is believed to effect crosslinking within the amorphous regions of propylene polymers, whilst producing a surprisingly small number of undesirable chain scissions, and those mainly within the crystalline regions. The higher temperature post-irradiation annealing of the present invention, in comparison with prior processes, is believed to bring about a qualitatively different product, with crosslinking taking place close to the boundary of the crystalline regions, so bringing about "pinning" of those regions. The resultant products have very high gel fractions, even at relatively low radiation doses, such as 5 Mrads, and good mechanical properties. There appears to be a particularly good balance of properties obtained by irradiating at a dose of 5 to 15 Mrads, followed by the high temperature annealing.

In accordance with the present invention there is provided a polypropylene polymer treated in accordance with the process of the invention, as defined above. Suitably the treated propylene polymer has a gel fraction of at least 0.7, suitably at least 0.8. The polypropylene polymer preferably has a melting point of at least 135° C. preferably a melting point of at least 150° C.

DESCRIPTION OF PREFERRED EMBODIMENTS

The invention will now be further described, by way of the following examples, which are illustrative only.

In most of the examples, namely those relating to FIGS. 1 to 8 hereof, a homopolymeric polypropylene film, available from Hoechst Celanese under the Trade Mark CELGARD® 2400, was used. The film is of isotactic polypropylene with a number average molecular weight in the range from 435,000 to 607,000, generally about 500,000, and a weight average molecular weight from 522,000 to 580,000 generally about 550,000. The film is microporous and is made by methods known in the art, as described in the patents referred to above relating to the manufacture of microporous films. Broadly, the polypropylene is extruded to form a sheet; the sheet is annealed; and then stretched at a relatively lower temperature, and then at a relatively higher temperature.

For some experiments (see FIG. 9) the polypropylene was a syndiotactic polypropylene supplied by Hoechst AG, characterised as:

Hoechst G20 MFI 230/5=5 g/10 min, viscosity number= 215 cm$^3$/g, M$_w$=198,000 g/mol, M$_w$/M$_n$=2.3, m.pt.=140° C. and tacticity=Syn.

For some experiments (FIG. 10) an isotactic polypropylene hollow fibre fabric (iso-PP-hff) was used, supplied by Fina, under the trade name FINA® 3362. This is a polypropylene polymer having the following typical properties: melt flow 3.8 g/10 min; density 0.905 g/cm$^3$; m.pt. 165° C.; tensile modulus 1515 MPa; flexural modulus 1380 MPa; flexural stiffness 1104 Mpa; fibre tenacity 5.8 g/denier; elongation 28%.

The processes by which the polypropylene films were treated, e-beam and γ-irradiation, were as follows.

For e-beam irradiations of polypropylene films, samples were placed in glass tubes under high vacuum for one hour, before being gassed with acetylene or other cross-linking agent at atmospheric pressure. Thorough removal of oxygen is thought to be very important in reducing undesirable chain scission events. The samples were then irradiated with an electron beam to the required dose, at ambient temperature. The doses were measured by means of a standard dosimeter located adjacent to the tubes during irradiation. Following irradiation the samples were annealed at the stated elevated temperature for one hour, in the same atmosphere.

For γ-irradiations, the polypropylene samples were placed in a steel container, which was evacuated of air and left for a period of time, to check for leakage of air inwards. Once no leakage of air inwards had been confirmed the container was gassed with acetylene at a pressure of around 1 to 1.5 atmosphere (10$^5$ Pa–1.5×10$^5$ Pa). The container was again left for a period of time, in order to check for leakage of acetylene. Once no leakage of acetylene outwards had been confirmed the container was γ-irradiated using a $^{60}$Co source, to the required dose. This was measured by pre-calibration using red perspex absorption dosimeters (AERE, Harwell, Oxon), type 4034R, λ=640 nm. After irradiation the container was again checked for leakage of acetylene outwards. Once no leakage of acetylene had again been confirmed the container was quickly evacuated, to remove any traces of adventitious air which may have entered it, and then regassed with acetylene, to a pressure of 1.5 atmospheres (15×10$^4$ Pa). The container was then placed in an oven and annealed for 5 hours at 135° C. (FIG. 9) or 120° C. (FIG. 10)

Comparison experiments were carried out, using CELGARD® 2400 polypropylene film and the e-beam method, and with all aspects of the e-beam process being as described above, except that in one series of comparison experiments the annealing temperature was 100° C.; and in another the irradiation ahd the annealing, the latter at 135° C., were both carried out in vacuo; and in another annealing was carried out in vacuo at 135° C., without any irradiation having been carried out.

Following the treatments the samples, and in addition untreated CELGARD® 2400 polypropylene film, were subjected to gel fraction testing and to thermo-mechanical analysis (TMA). The gel fraction tests were carried out by a method described in the Journal of Polymer Science: Part B: Polymer Physics, 1993, Vol. 31, p. 809 (R. A. Jones, G. A. Salmon and I. M. Ward). TMA was carried out by standard methodology, using a Mettler TA3000 thermal analysis system, comprising a TC10TA processor and a TMA 40 thermomechanical analyzer, in the transverse and draw directions, using samples of the polypropylene membrane of size 5 mm×5 mm, a temperature ramp rate of 5° C. $min^{-1}$ and a total load of 2 g.

Figure 1:
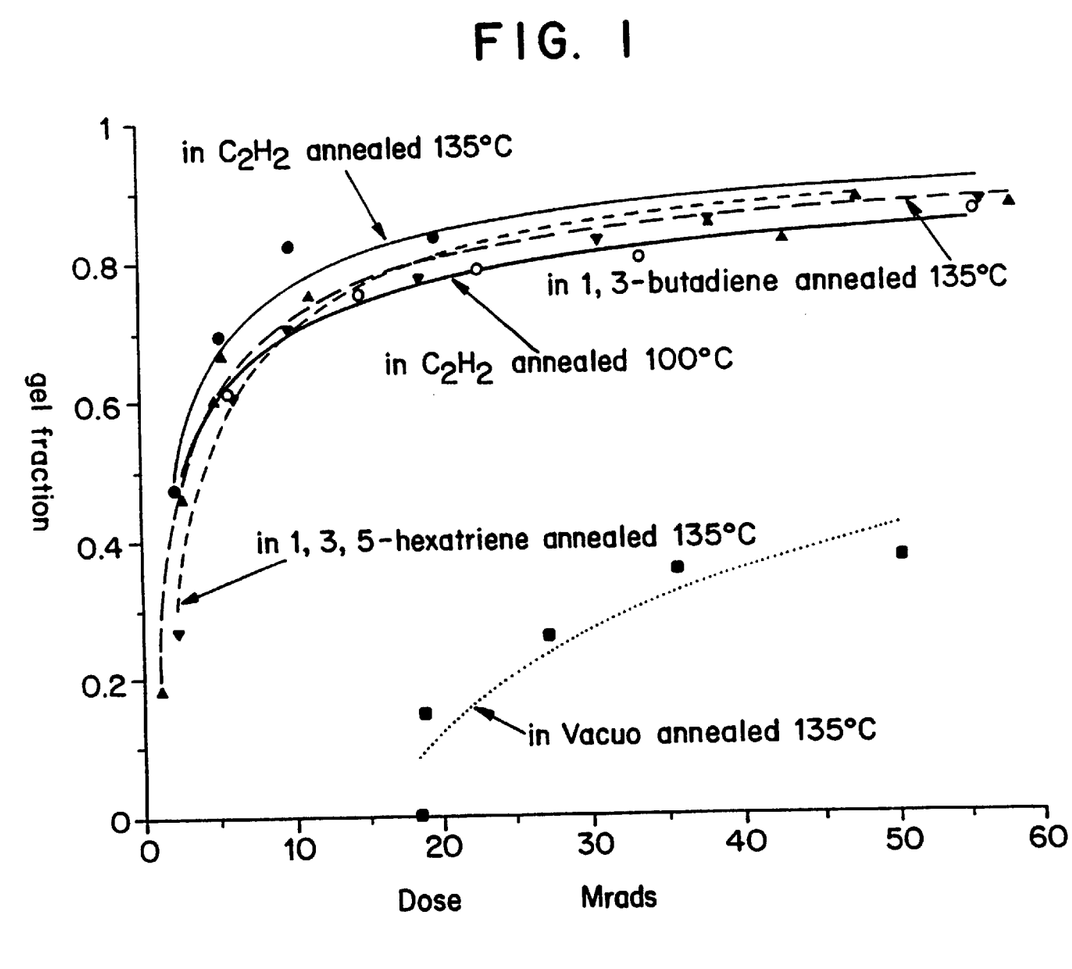
FIG. 1 illustrates gel fractions of irradiated polypropylene as a function of radiation dosage and process conditions.

The results are set out in the graphs of FIGS. 1 to 10, which can briefly be summarised as follows:

FIG. 1 relates to gel fraction tests in accordance with the present invention, irradiated and annealed in acetylene in comparison with material irradiated in vacuo and annealed in vacuo at 135° C., and with material irradiated and annealed in the presence of acetylene, but with the annealing taking place at 100° C. It will be seen that a very high gel fraction of about 0.8 was obtained with the process of the invention, even at a dose of 10 Mrads. In comparison, the in vacuo process gave no appreciable gel fraction until a dose of 18.7 Mrads was delivered, and even then the gel fraction was only about 0.15. The presence of acetylene but with annealing only at 100° C. gave significantly lower gel fractions at given doses, compared with the-present invention. This is an important result, given that the higher the dose rate, the higher the number of deleterious chain scissions which can be expected.

Also plotted on FIG. 1 are the results for materials irradiated and annealed in 1,3-butadiene and 1,3,5-hexatriene respectively. The 1,3-butadiene test was carried out in the same way as the acetylene test described above. The 1,3,5-hexatriene test was different, because 1,3,5-hexatriene is a volatile liquid at ambient temperature. Therefore, the CELGARD® polypropylene was impregnated with it. The polypropylene and liquid 1,3,5-hexatriene was put in a sealed steel tube, with the hexatriene at the bottom of the tube and the polypropylene above it. The bottom of the tube was immersed in liquid nitrogen and the tube evacuated. The tube was then heated to 110° C. to varorise the hexatriene to a pressure of about 1 atmosphere, and impregnate the polypropylene. Irradiation was carried out at ambient temperature, and annealing at 135° C.

Figure 2:
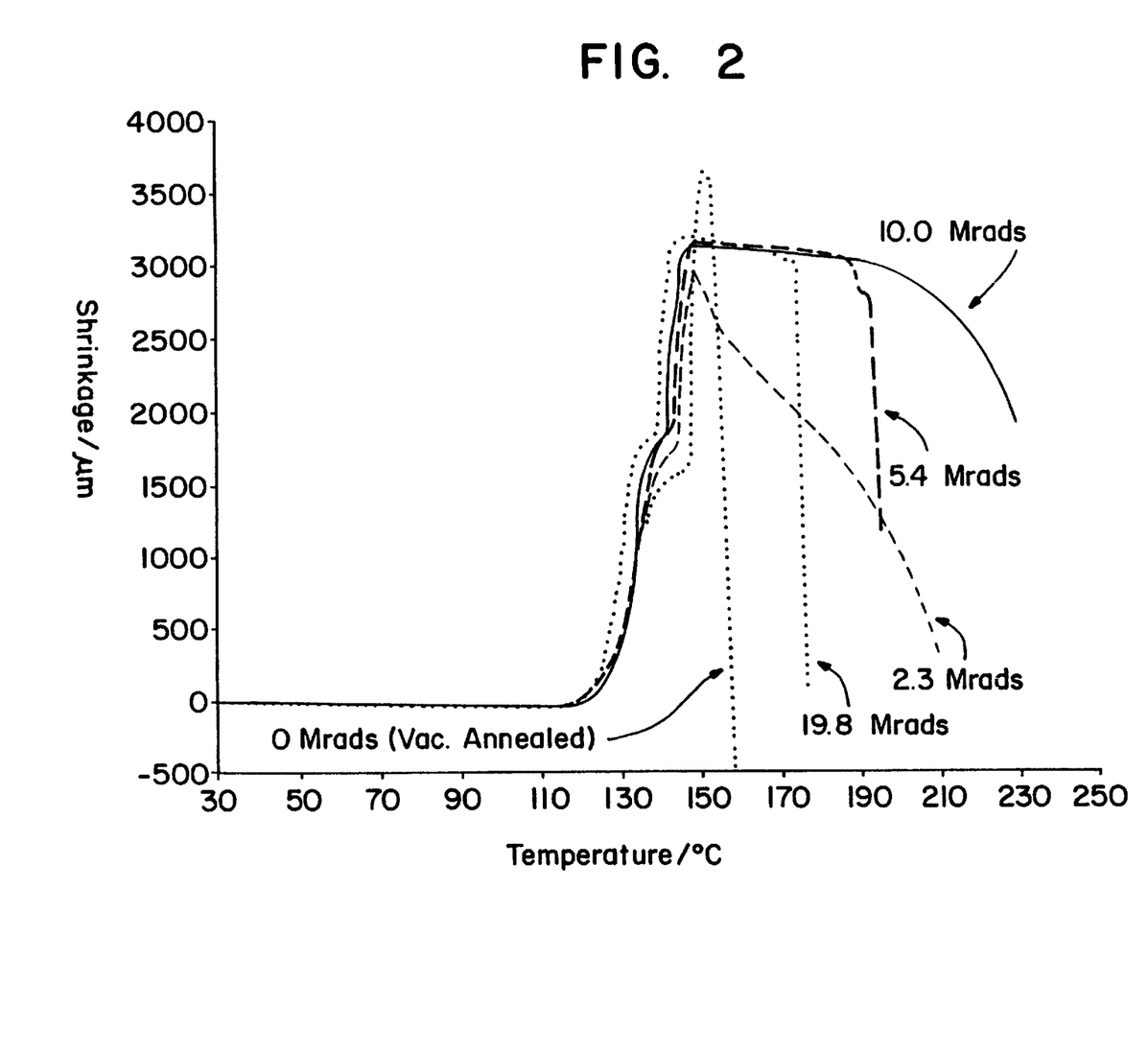
FIGS. 2–4 illustrate the thermal mechanical analysis (in the draw direction) of various polypropylene films.
Figure 3:
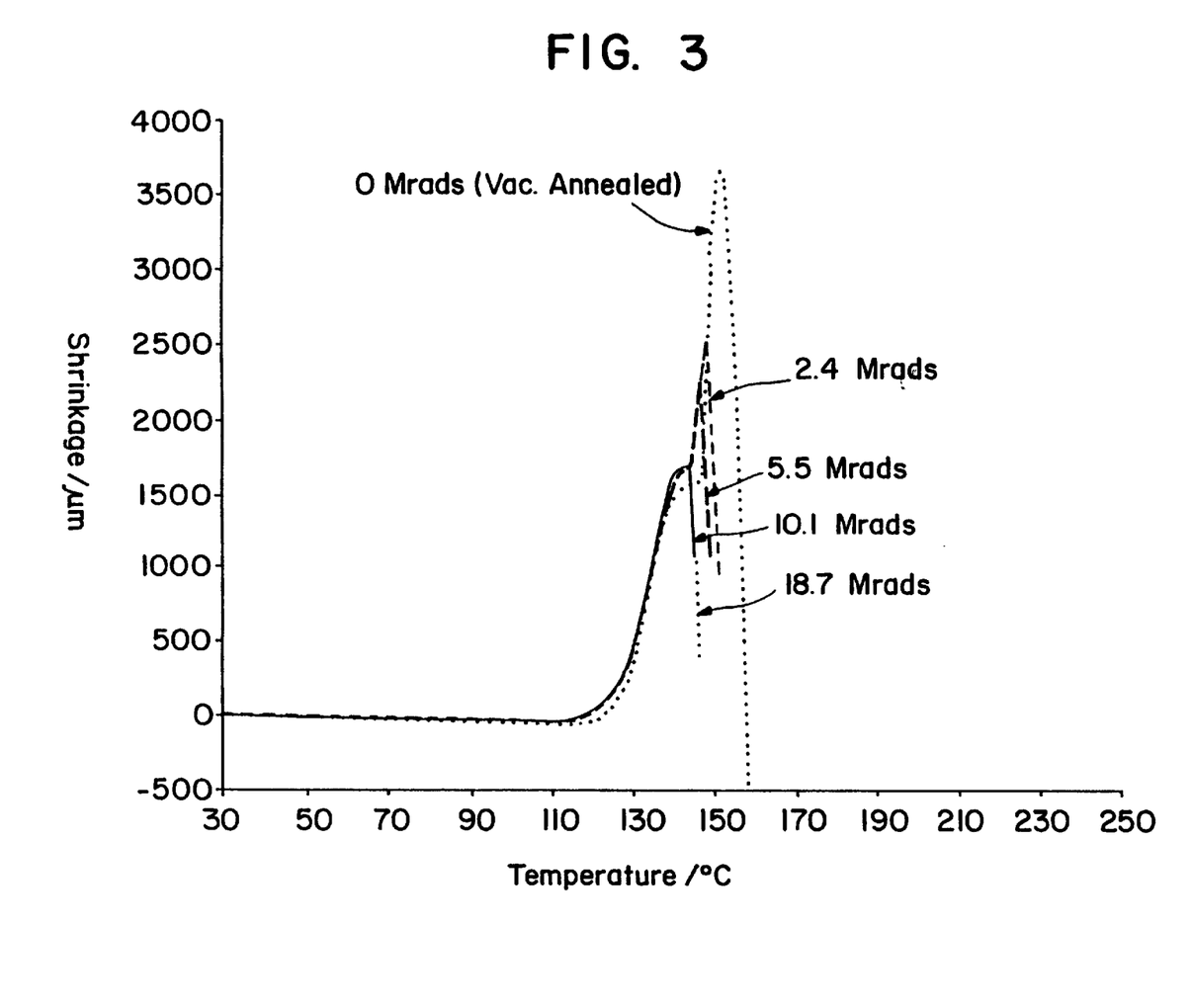
Figure 4:
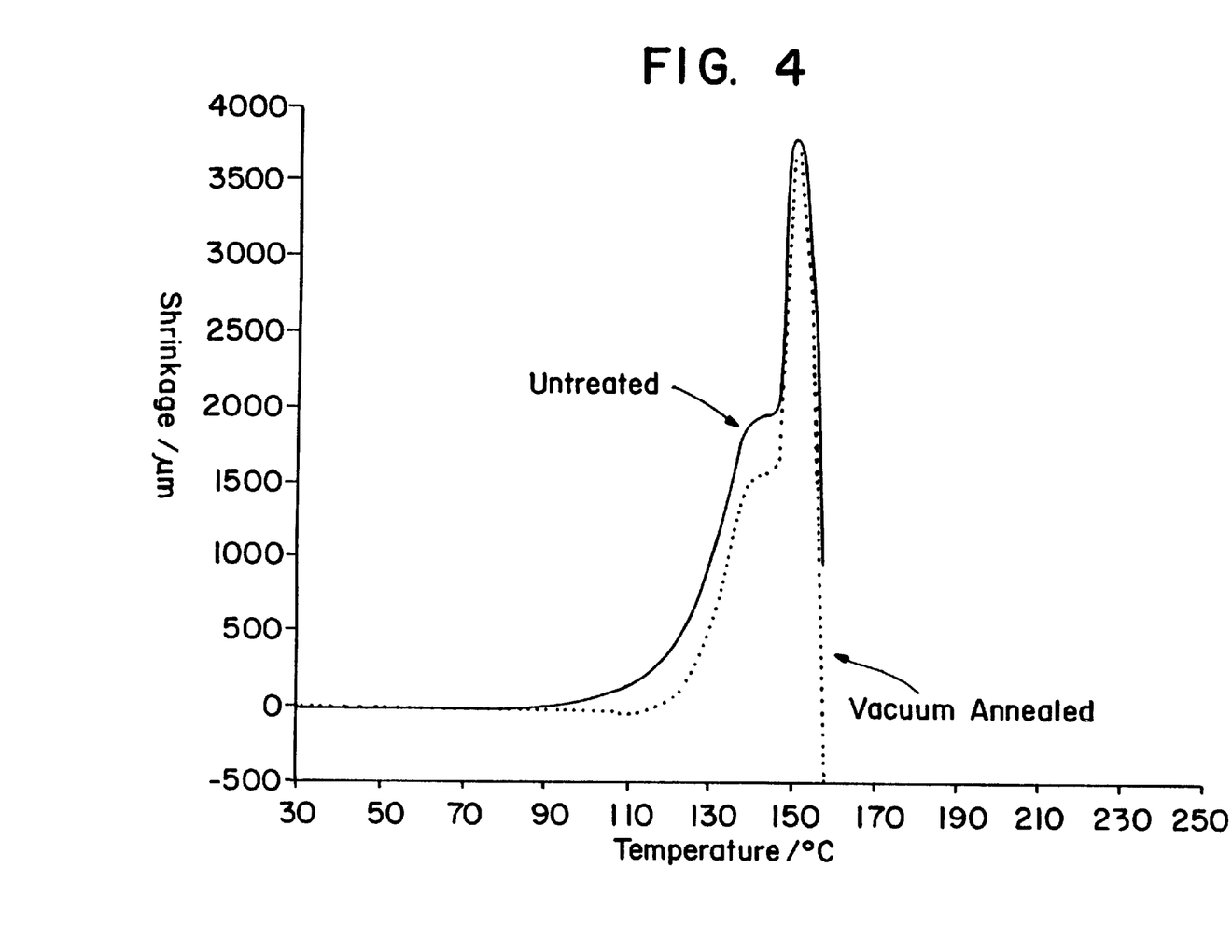

FIGS. 2, 3 and 4 relate to TMA in the draw direction, carried out on CELGARD® 2400 polypropylene film: a) treated in accordance with the invention, having been irradiated in acetylene and annealed at 135° C. in acetylene (FIG. 2); b) annealed in vacuo at 135° C., and having either not been irradiated, or having been irradiated in vacuo (FIG. 3); and c) on such film itself, untreated, or having been annealed at 135° C. without having been irradiated (FIG. 4). FIGS. 2, 3 and 4 are drawn to the same scale for direct comparison. FIG. 4 shows that merely vacuum annealing the polypropylene film at 135° C., without prior irradiation, has little effect on the failure of the film. FIG. 3 shows that irradiation in vacuo prior to vacuum annealing at 135° C. reduces failure onset temperature, the effect being greater at higher doses of irradiation. This is believed to be a consequence of chain scission caused by the radiation. FIG. 2 shows the result that at all radiation doses the failure onset temperature was higher than that for the unirradiated comparison sample, but that the differences were least at the relatively low dose of 2.3 Mrads and, more markedly so, at the relatively high dose of 19.8 Mrads. Between these doses, and especially at a dose of 10.0 Mrads, the onset failure temperature was very high, much greater than the unirradiated membrane melt temperature, probably as a consequence of enhanced crosslinking accompanied by a relatively low incidence of chain scissions, leading to improved visco-elastic properties and improved melt flow properties at elevated temperatures. It is believed that the crystalline regions effectively melt but cannot flow due to the crosslinking within the amorphous regions, which have rubber-like properties at elevated temperatures, and the "pinning" of the boundaries of the melted regions which previously were crystalline. It is believed that on cooling the melted regions recrystallise and that the material recovers its normal lower temperature properties. These properties may have considerable industrial application, for example for membranes which may be subject to occasional elevated temperatures, whether intended or unintended.

Figure 5:
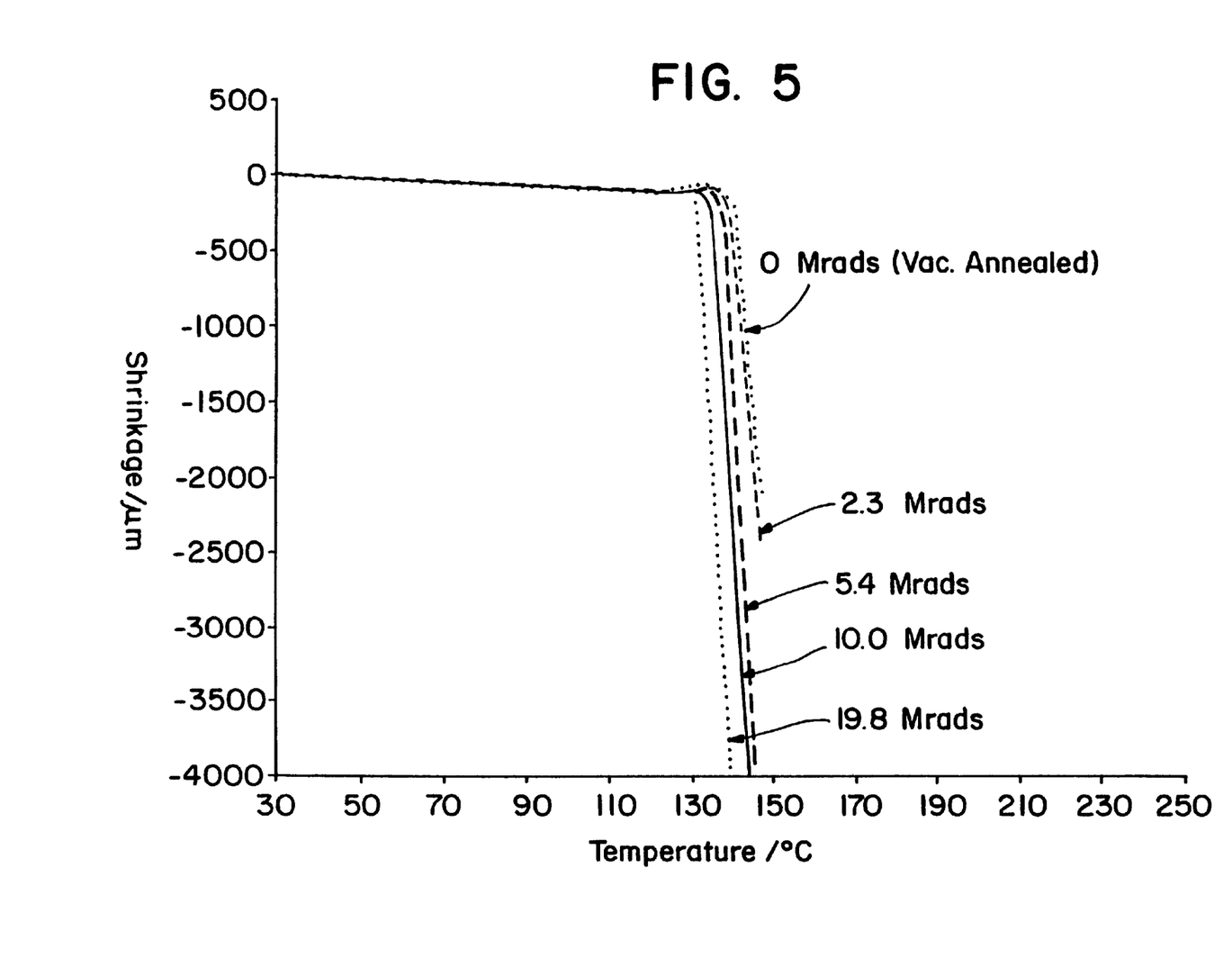
FIGS. 5–7 illustrate the thermal mechanical analysis (in the transverse direction) of various polypropylene films.
Figure 6:
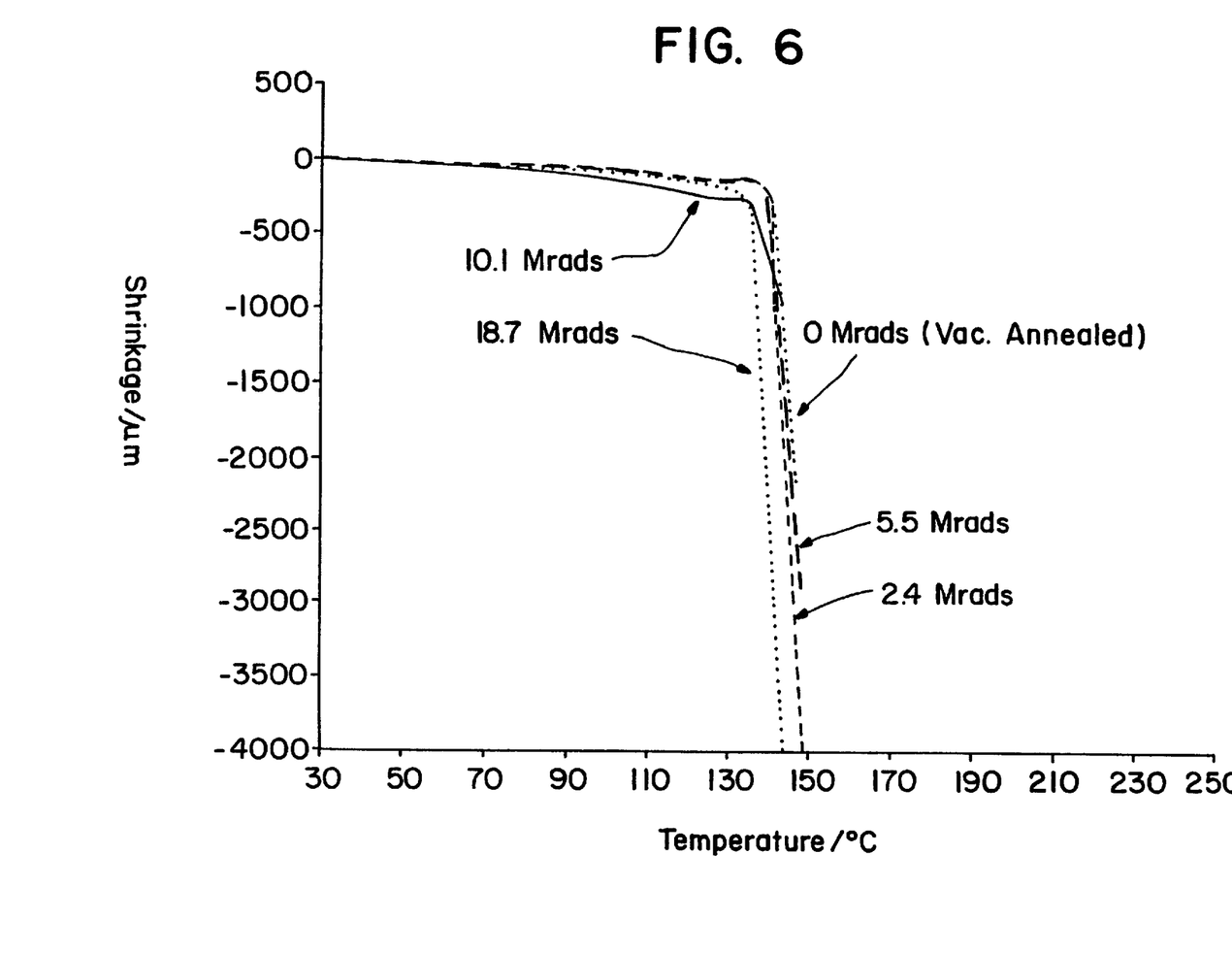
Figure 7:
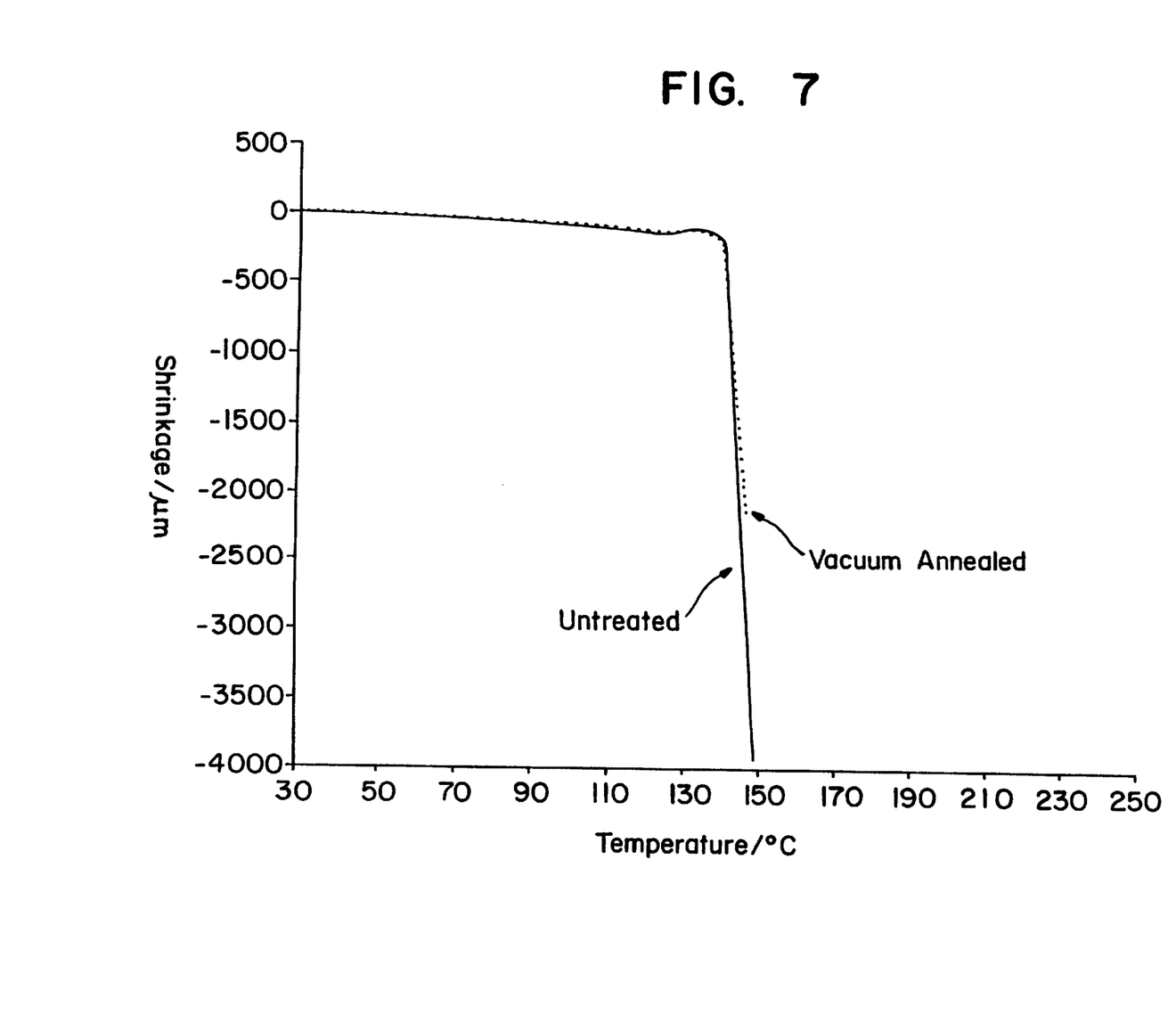

FIG. 5, 6 or 7 are graphs corresponding to FIG. 2, 3 or 4 respectively but relate to TMA in the transverse direction. All of the graphs are very similar and show that transverse properties are only little affected by the process of the present invention. This is thought to be because the transverse properties are primarily determined by the crystalline regions generally extending orthogonally to the draw direction, and that the crosslinking achieved by the process of the present invention takes place in the amorphous regions. The slight diminution in transverse failure onset temperatures, most marked at a radiation dose of 19.8 Mrads, is thought to be a consequence of chain scission within the crystalline regions.

Figure 8:
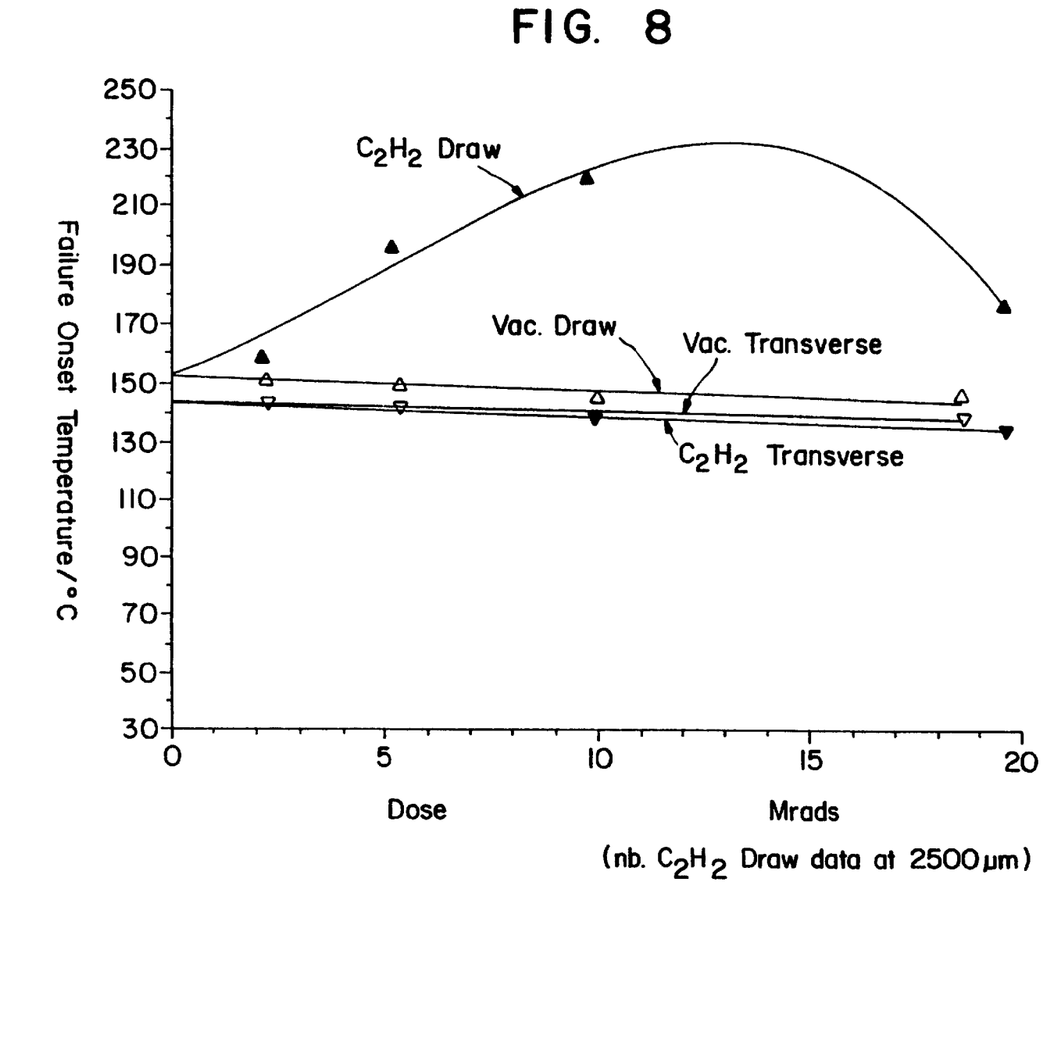
FIG. 8 illustrates failure onset temperature as a function of radiation dosage.

FIG. 8 presents results shown in FIGS. 2, 3, 5 and 6 in a graph relating failure onset temperature to doses and showing the substantial increase in failure onset temperatures in the draw direction achieved at intermediate doses.

Figure 9:
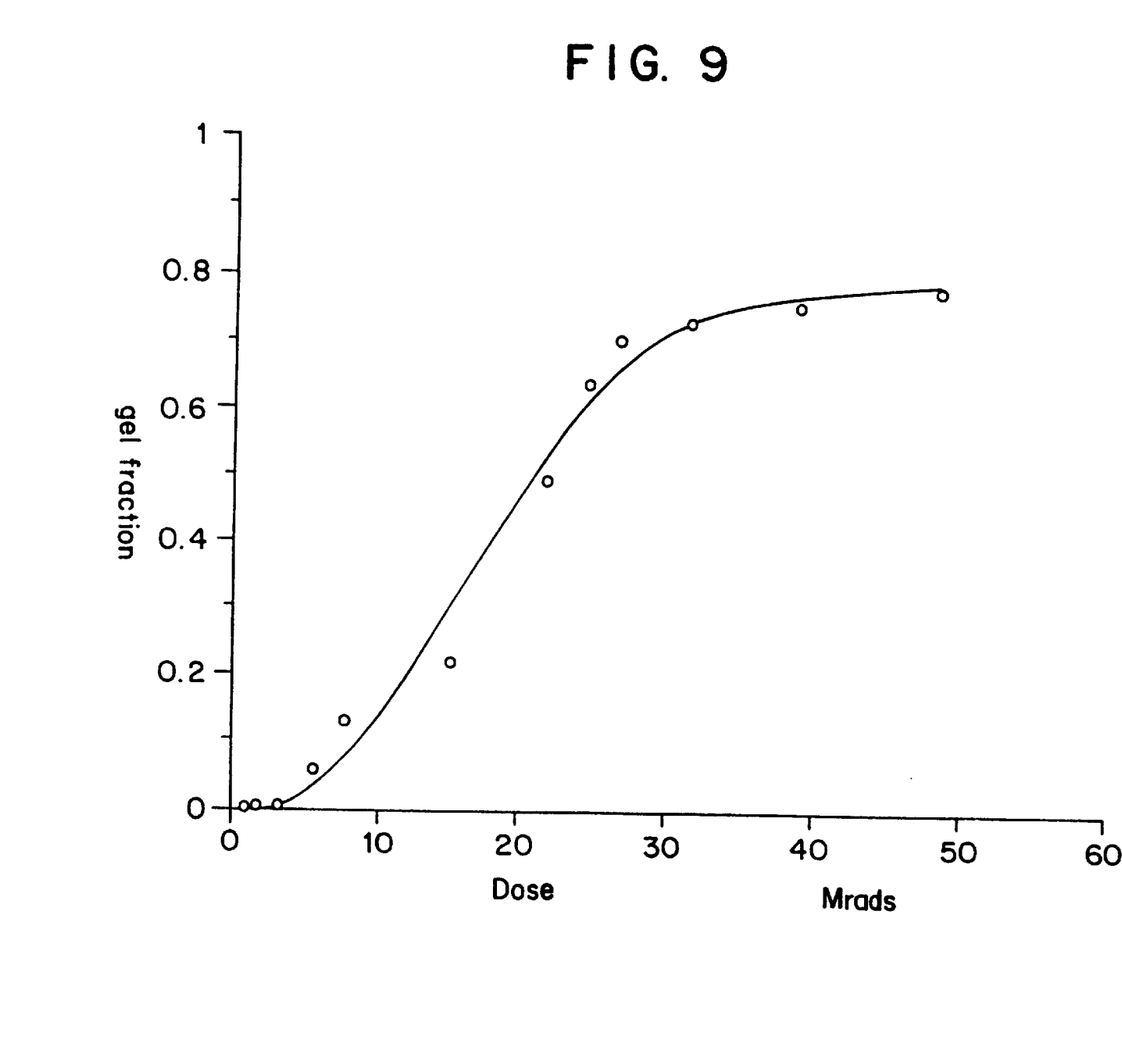
FIG. 9 illustrates gel fractions of syndiotactic polypropylene as a function of radiation dosage.
Figure 10:
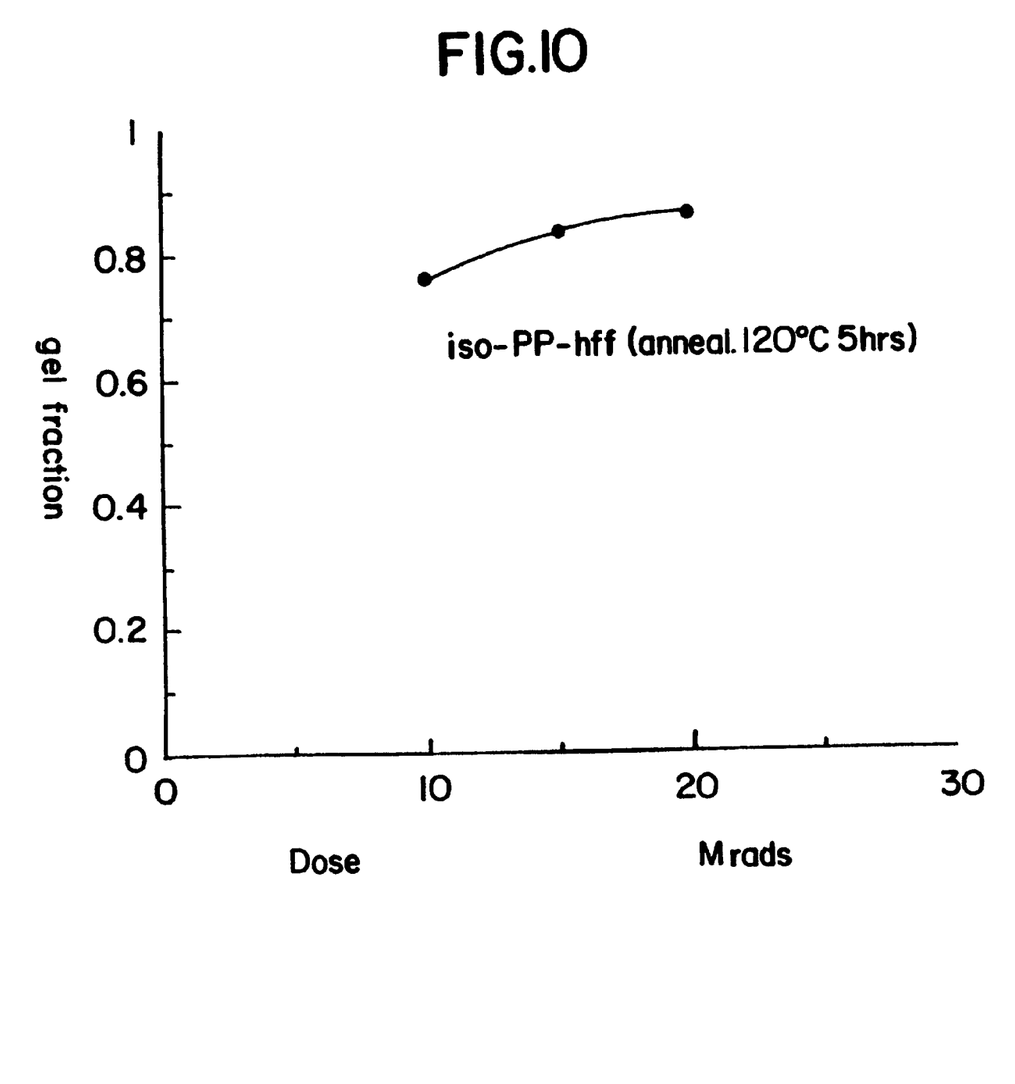
FIG. 10 illustrates gel fraction of an isotactic polypropylene as a function of radiation dosage.

FIG. 9 shows the gel fraction results for the syndiotactic polypropylene described above. Samples (ca. 7 g, ca. 30 $cm^2$) were pressed (20 tonnes, 190° C., 2 min), between brass plates (0.25 mm edge-spacers), and quench cooled (16° C., 2 min). Strips 1.4 mm), cut from the pressings, were placed in glass irradiation tubes, evacuated of air gases (ca 1 hr., 20° C.), gassed with acetylene (1 atm.) and irradiated using an electron beam as described above, and annealed at 135° C. Gel fraction testing was then carried out using the method referenced above.

All of the examples described above relate to polypropylene treated by the e-beam process described above.

The further figure (FIG. 10) and the following further examples relate to polypropylene treated by the γ-irradiation process described above. FIG. 10 presents the results for the FINA® 3362 polypropylene homopolymer, irradiated and annealed in acetylene at 1.5 atm., the irradiation supplying dosages of 10, 15 and 20 Mrads, and the annealing taking place for 5 hours at 120° C.

In further tests samples of CELGARD® were heated to 135° C. during evacuation and gassing, both prior to and following γ-irradiation. The doses given to these samples of polypropylene were relatively low, 5 Mrads and 10 Mrads, and yielded gel fractions of 0.595 and 0.528 respectively. It is believed that there may have been a problem or oxygen ingress or low dosing leading to these lower than expected gel fraction values.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A process for preparing a modified polypropylene polymer from a precursor polypropylene polymer, the process comprising an irradiation step comprising treating such precursor polymer with an ionizing radiation; and an annealing step comprising annealing the polymer so treated at an annealing temperature in the range of 130° C. to 140° C. in an environment which is substantially free of oxygen gas but which comprises a monomeric compound selected from alkynes, and from alkyenes having at least two double bonds.

2. A process as claimed in claim 1, wherein the polypropylene polymer is polypropylene homopolymer or a copolymer containing a major proportion of polypropylene.

3. A process as claimed in claim 2, wherein the polypropylene polymer is unsubstituted polypropylene homopolymer.

4. A process as claimed in claim 1, wherein the polypropylene polymer is in the form of a fibre.

5. A process as claimed in claim 1, wherein the polypropylene polymer is in the form of a film.

6. A process as claimed in claim 5, wherein the polypropylene polymer is in the form of a microporous film.

7. A process as claimed in claim 1, wherein said environment for the annealing step is a gaseous environment.

8. A process as claimed in claim 1, wherein said environment is constituted entirely by one or more of said monomeric compounds.

9. A process as claimed in claim 1, wherein said monomeric compound is selected from unsubstituted $C_{2-6}$ alkynes and from unsubstituted $C_{4-8}$ hydrocarbons having at least two double bonds.

10. A process as claimed in claim 9, wherein said monomeric compound is selected from 1,3-butadiene, 1,3-pentadiene 1,3-hexadiene, 1,4-hexadiene and 1,3,5-hexatriene.

11. A process as claimed in claim 9, wherein said monomeric compound is selected from acetylene, methyl acetylene, dimethyl acetylene and ethyl acetylene.

12. A process as claimed in claim 11, wherein said monomeric compound is acetylene.

13. A process as claimed in claim 1, wherein said alkenes having at least two double bonds have at least two conjugated double bonds.

14. A process as claimed in claim 1, wherein said alkenes having at least two double bonds have double bonds at least as the terminal bonds in the compounds.

15. A process as claimed in claim 1, wherein said ionizing radiation is selected from the group comprising γ-radiation, ultra violet radiation and electron beam radiation.

16. A process as claimed in claim 1, wherein the radiation dose is in the range 0.5 to 100 Mrads.

17. A process as claimed in claim 16, wherein the radiation dose is in the range 1 to 50 Mrada.

18. A process as claimed in claim 17, wherein the radiation dose is in the range 2 to 20 Mrads.

19. A process as claimed in claim 18, wherein the radiation dose is in the range 5 to 15 Mrads.

20. A process as claimed in claim 1, wherein the polypropylene polymer is treated with said ionizing radiation at a temperature not exceeding 100° C.

21. A process as claimed in claim 20, wherein the polypropylene polymer is treated with said ionizing radiation at a temperature in the range 0–50° C.

22. A process as claimed in claim 1, wherein the polypropylene polymer is treated with said ionizing radiation in an environment substantially free of oxygen gas.

23. A process as claimed in claim 22, wherein the polypropylene polymer is treated with said ionizing radiation in an environment which comprises a monomeric compound selected from the group consisting of alkynes, and alkenes having at least two double bonds.

24. A process as claimed in claim 23, wherein said environment for the irradiation step is a gaseous environment.

25. A process as claimed in claim 23, wherein said environment for the irradiation step is constituted entirely by one or more or said monomeric compounds.

26. A process as claimed in claim 23, wherein said nonomeric compound is selected from unsubstituted $C_{2-6}$ alkynes and from unsubstituted $C_{4-8}$ hydrocarbons having at least two double bonds.

27. A process as claimed in claim 26, wherein said monomeric compound is selected from 1,3-butadiene, 1,3-pentadiene, 1,3-hexadiene, 1,4-hexadiene and 1,3,5-hexadiene.

28. A process as claimed in claim 26, wherein said monomeric compound is selected from acetylene, methyl acetylene, dimethyl acetylene and ethyl acetylene.

29. A process as claimed in claim 28, wherein said monomeric compound is acetylene.

30. A process as claimed in claim 23, wherein said alkenes having at least two double bonds have at least two conjugated double bonds.

31. A process as claimed in claim 23, wherein said alkenes having at least two double bonds have double bonds at least as the terminal bonds in the compounds.

32. A process as claimed in claim 23, wherein said irradiation environment and said annealing environment are substantially the same.

33. A process as claimed in claim 1, wherein the polypropylene polymer comprises an isotatic polymer.

34. A process as claimed in claim 1, wherein the polypropylene polymer comprises a syndiotactic polymer.

35. A polypropylene polymer prepared by a process as claimed in claim 1.

* * * * *